Feb. 22, 1955  E. MEILI  2,702,898
GAS-RESPONSIVE CONTROL APPARATUS
Filed Oct. 6, 1953

INVENTOR.
Ernst Meili
BY
Attorneys

| United States Patent Office | 2,702,898 |
|---|---|
| | Patented Feb. 22, 1955 |

2,702,898

GAS-RESPONSIVE CONTROL APPARATUS

Ernst Meili, Bad Ragaz, Switzerland, assignor to Electro-Watt Electrical and Industrial Management Co., Ltd., Zurich, Switzerland, a company of Switzerland Continuation of abandoned application Serial No. 108,015, August 1, 1949. This application October 6, 1953, Serial No. 384,478

14 Claims. (Cl. 340—237)

This application is a continuation of application, Serial Number 108,015, filed August 1, 1949, now abandoned.

The present invention relates to apparatus responsive to changes in the composition of a gas, and particularly to such apparatus accurately operative under changes in the density of the gas. While such apparatus may be used for other purposes, it is particularly suitable for testing air for the presence of smoke and other combustion products.

In the past automatic fire detection apparatus generally has been either of the thermostatic type, responsive to temperature or of the photoelectric type responsive to light reflected from, or blocked by, visible smoke.

It is important to note that the operation of a thermostatic detector is caused by the presence of a high temperature or a fast rate of rise of temperature conditions generally produced by a comparatively large fire. Thus, by the time the alarm is given the fire may have spread to the extent that it will be difficult to extinguish and considerable damage has been caused. The thermostatic detector can not be set to a high sensitivity as false operations might take place because of large temperature rises caused by the sun or heating systems.

The development of the photoelectric detector was a considerable improvement over the thermostatic detector because of the greater sensitivity and ability to detect a fire in its very early stage. Because of its complicated design and high cost of installation and maintenance, the photoelectric detector has had somewhat limited usage.

In order to provide the desired smoke sensitivity at low expense attempts have been made to overcome the disadvantages of the thermic and photoelectric detectors by providing a detector utilizing the effect of smoke on the conductivity of an ionization chamber. Such ionization detectors have not been wholly satisfactory under variable conditions of air density which may be due to changes in temperature or barometric pressure.

The present invention aims to overcome the foregoing difficulties and disadvantages of prior detectors by providing an ionization detector which is to a large extent self compensating with respect to the effects caused by changes in the density of the gas being tested.

In accordance with the invention this is accomplished by providing a detector including one or more ionization chambers and a gas discharge tube in a construction in which the parts are to a large extent telescoped or nested within each other in such manner that insulation need be provided only along a single area exposed to the atmosphere. In the event the detector employs two ionization chambers, a construction may be utilized wherein a single gas ionizing means is provided for both chambers and is so disposed that both chambers are subjected to substantially equal degrees of ionization. Additionally, the parts of the detector may be so arranged that the walls of the different ionization chambers may be utilized as a condenser for operating the gas discharge tube.

Another object of the invention is to provide a device of the character indicated which is simple and compact in construction, reliable in operation, and capable of manufacture at a reasonable cost.

Other objects and advantages of the invention will be apparent from the following description and from the accompanying drawing which shows by way of example, an embodiment of the invention.

The operating principle of the ionization detector depends upon the action of certain elements as radium which possess the remarkable property of continuously disintegrating and emitting a constant stream of particles into the surrounding air. The process of disintegration is slow, and in the case of radium more than a thousand years will pass before half of the original amount of the material has disintegrated.

A source of radium emits forms of radiation known as alpha, beta and gamma. In the ionization detector the action of the alpha particles is most important. The alpha particles are helium atoms which, when projected from the surface of the radium possess the property of rendering the air through which they pass conductive by ionizing part of the air molecules. Therefore, if a fragment of radium is enclosed within a chamber consisting of two electrodes, alpha particles will streak out in all directions and the air will become ionized. Such a chamber is known as an ionization chamber, and if a voltage is applied to its two electrodes a minute current will flow through the chamber due to the fact that the ions and electrons resulting from the ionizing action of the alpha radiation are driven towards the electrodes by the electric field.

The alpha radiation has a limited range of only about one to two inches in air before being stopped by impact with air molecules. The alpha radiation can also be blocked by a thin sheet of metal, paper, or small particles of other material such as dust or smoke. This phenomena is utilized to advantage in the ionization detector as smoke particles are in effect a form of dust and many thousands of times larger than normal air molecules. However this does not mean necessarily that the smoke particles need be large enough to be visible to be effective and the ionization detector takes advantage of the fact that generally only an extremely small percentage of all the smoke particles formed by a fire are visible.

By reason of the presence of the visible or invisible smoke particles, the alpha radiation is stopped prematurely thus fewer electrons and ions are formed than in normal air and the current through the ionization chamber will decrease considerably. Of course, the heavy smoke particles may be also ionized by the alpha rays, but being much less mobile than ions, will usually recombine with electrons before having travelled far. This is another important effect leading to a decrease of ionization current in the case of the presence of combustion gases.

Another phenomena utilized to advantage in the ionization detector is that the visible smoke particles are stable and do not deteriorate rapidly. However, the smaller invisible smoke particles, which probably were formed of half-stable complexes of a large number of agglomerated gas molecules which have a limited life time seem to break up slowly into gas molecules of normal size. In the case of old or stale smoke only the visible particles remain and the invisible particles, which have the greatest action in the ionizing chamber, have deteriorated. For this reason for example, in a room where cigarettes have been smoked for a long time without ventilation there may be a high concentration of visible smoke, but no alarm. If the same amount of tobacco would have been burnt within a shorter time an alarm would have been given. The sensitivity of the ionization type detector can, therefore, not be measured by any quantity of visible smoke but only by the quantity of material burnt each minute, that is the size of the fire.

The indication of the ionization detector depends upon the decrease in the ionization current. As this current is very small extremely sensitive means are required for its indication. A cold cathode tube is preferred for this purpose as it may be maintained in a state of readiness for operation without a heating current and thus has a practically unlimited life. In order to trigger the cold cathode tube the change in the ionization current is converted into a change in voltage by connecting a second ionization chamber or resistance equivalent in series with the test chamber. A potential is applied to the series arrangement in a parallel connection with the cold cathode tube and the potential across the test chamber is used for controlling the tube. The invention will be further described by reference to the accompanying drawings showing a number of embodiments of the present invention, wherein:

Fig. 4 shows a modification wherein the two ionization chambers are of symmetrical construction; while

Figure 1:
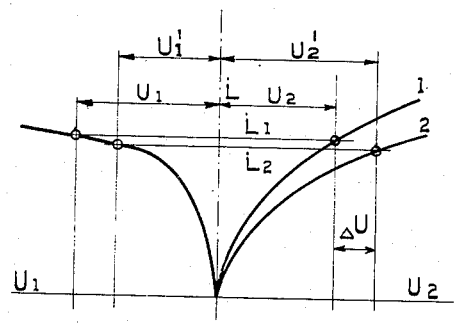
Fig. 1 is a graph showing the current-voltage characteristics of the gases in the testing and control ionization chambers.

At the right of Fig. 1, there is shown schematically the course of the current-voltage characteristic of an ionization chamber, the curve 1 representing the characteristic for pure air and curve 2 that for air mixed with combustion gases. As stated above, these ionization chamber currents and their changes are very small and difficult to measure, and the current change is converted into a voltage change, by the series arrangement of the test chamber and a resistance or its equivalent. The manufacture of high ohmic resistances which are to remain absolutely constant over long periods of time is rather difficult, for which reason it has also been suggested, as already mentioned, to employ a second or control ionization chamber. As will be readily understood, the voltage change at the measuring ionization chamber becomes greatest when the second or control chamber, operates in the saturation range of its current-voltage characteristic.

The effect of such an arrangement is indicated in Fig. 1. At the left of this figure, there is shown the current-voltage characteristic of the second or control chamber. To the two chambers connected in series, there is applied the total voltage U. In the absence of smoke, the voltage may, for example, be divided corresponding to the distances $U_1$ and $U_2$. When combustion gases and smoke are present in the testing or measuring chamber, the distribution of voltages changes in the manner indicated by the distances $U_1'$ and $U_2'$. Since the applied voltage is constant, then $U=U_1+U_2=U_1'+U_2'$. The voltage change at the testing chamber due to the influence of smoke corresponds to the difference $U_2'-U_2=\Delta U$, and this voltage change can be utilized for actuating a voltage-sensitive device such as a cold cathode tube. However, there are also possible combinations with other amplifying tubes as well as with other suitable devices sensitive to voltage changes. It is thus clear from the foregoing, that not only resistances and ionization chambers may be connected in series with the test chamber but also other known suitable means can be utilized as circuit elements provided they have a suitable current-voltage characteristic.

Figure 2:
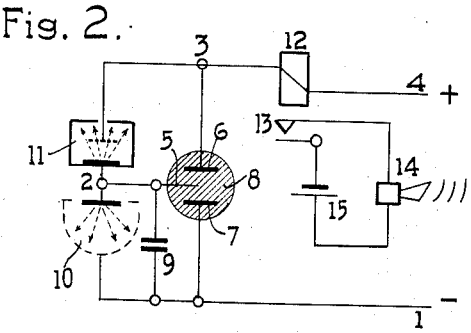
Fig. 2 shows schematically a circuit diagram of the apparatus of the present invention.

A circuit for apparatus constructed in accordance with the invention is shown in Fig. 2. It includes a direct current supply, conductors 1 and 4, in series with the winding of relay coil 12, by which a uniform voltage is applied to anode 6 and cathode 7 of a glow relay 8 as well as to one of the electrodes of each of ionizing chambers 10 and 11. The ionization chamber 10 is employed as the testing or measuring chamber and is open to the gas to be tested, while the ionization chamber 11 acts as a comparison chamber and resistance equivalent. The electrodes of the chambers 10 and 11 are at a common potential at the point 2 and a connection is made with the control electrode 5 of the cold cathode tube or gas discharge lamp 8. A condenser 9 is connected in parallel with the ionization chamber 10 and serves for storing control energy. When combustion gases enter the ionization chamber 10, its conductivity is reduced and consequently the voltage between the cothode z and the control electrode 5 of the glow relay 8 increases. The condenser 9 discharges partially through the cold cathode tube and thereby initiates current flow between the anode 6 and the cathode 7. A relatively strong current then flows from the conductor 4 through the relay coil 12 and cold cathode tube 8 to the conductor 1. By the action of this current, contact 13 of the relay is closed, and actuates an alarm 14, such as a horn, supplied by a battery 15.

It is advantageous to connect the control gap of the cold cathode tube or gas discharge lamp directly in parallel with the test chamber. In this case the voltage at the control gap will not vary appreciably with a variation of the applied external voltage, when the chamber 11 is operated at saturation as will later appear. It is further of advantage to connect the capacity 9 between the control electrode 5 and the cathode 7 in order to avoid possible ignition of the cold cathode tube upon the initial application of the external voltage by capacitive shock voltages.

The most important feature of the present invention is that means are provided whereby changes in the density of the atmosphere have practically no effect on the potential of the control electrode.

Experience has shown that the conductivity of an ionization chamber is influenced to an important degree by density changes in the gases present therein. The normal atmospheric pressure and temperature fluctuations, unless otherwise compensated, would affect the action of the usual ionization chamber to such an extent that it must be adjusted for low sensitivity with respect to smoke to assure sufficient security against false operation in case of temperature or barometric variations. Effective compensation for density variations becomes particularly important for detectors used on aircraft or under other conditions of extreme density variations.

In accordance with the present invention the second or control ionization chamber is maintained at atmospheric pressure, a tortuous diffusion path being provided for the flow of air to provide a balanced pressure in both chambers without the hazard of the entry into the second or comparison chamber of an appreciable amount of the air being tested. However, there is no hazard in the ultimate passage of combustion gases into the comparison chamber as after a lapse of time the active particles have lost most of their capacity to alter the resistance of an ionization chamber.

The use of a control or comparison ionization chamber 11 which is not completely closed permits an advantageous construction in which the number of outside areas requiring high electrical insulation may be reduced to a single area. In accordance with the invention a construction is shown in Fig. 3 in which there is only a single area requiring high insulation.

Figure 3:
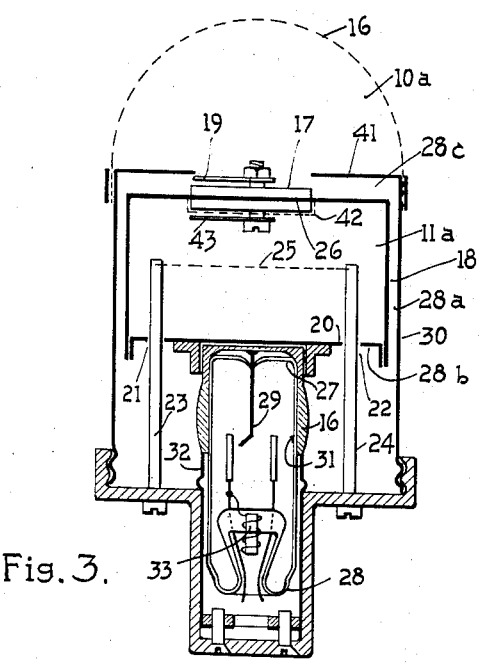
Fig. 3 shows schematically a central longitudinal section through a gas detecting apparatus in accordance with the invention.

In Fig. 3 the testing chamber 10a includes a grid-like dome 16 acting as one of its electrodes. It is electrically connected with the cylindrical cup 30 the importance of which will be discussed later on.

Cap 18 forms a common electrode of both the testing chamber 10a and the comparison chamber 11a. On its upper part are fixed the radioactive preparations 17 and 26 and the shutter 19 the function of which will be explained later.

While the upper part of the outside of cap 18 is one electrode of the testing chamber its inner surface and its bottom conducting plate 28b form the one electrode of the comparison or testing chamber. Bottom plate 28b is provided with 4 apertures such as 20 and 21 through which extend, with ample clearances, supports 23 and 24, projecting into the chamber 11a and carrying a grid-like structure 25 acting as a counter-electrode.

The ionizing rays for the chamber 11a emanate from a radium preparation 26 located in the interior of the chamber. The cap 18 is secured directly to head or top 27 of cold cathode or gas discharge tube 28, and is connected with a control electrode 29 extending out of the top of the tube 28. The diffusion space referred to above is shown at 28a and 28b and is formed in part by the space between the walls of the cap 18 and a radially spaced outer shell 30 supporting the grid-like dome 16 of the testing chamber.

The diffusion space 28a and its radially spaced walls may serve at the same time as a storage capacity for control energy for operation of the gas discharge tube 28. The construction described has the further advantage that for the parts forming the ionization chambers and for the capacity only one area of extremely high insulation is required. This area of high insulation is presented by glass wall 31 of the gas discharge tube which, in order to increase its insulation value, may be coated with a layer of wax or silicon as indicated at 31a. The gas discharge tube extends into a metallic shell 32 which acts as a ring of constant potential. The area of high insulation may be heated by a coil 33 positioned within the gas discharge tube, so that the external insulation area is heated through the glass wall. The heating of the highly insulated area minimizes the possibility of the condensation of water vapor thereon even under conditions of sudden temperature changes.

Density compensation of the highest degree results when both chambers are constructed as similarly as possible from the geometric standpoint and equally strong sources of radiation are utilized for ionization. The voltage drop across each of the chambers is then the same and with a variation of gas density the conductivity of both chambers will vary in the same manner. For this reason, the voltages across each chamber will remain the same irrespective of the variation.

Figure 4:
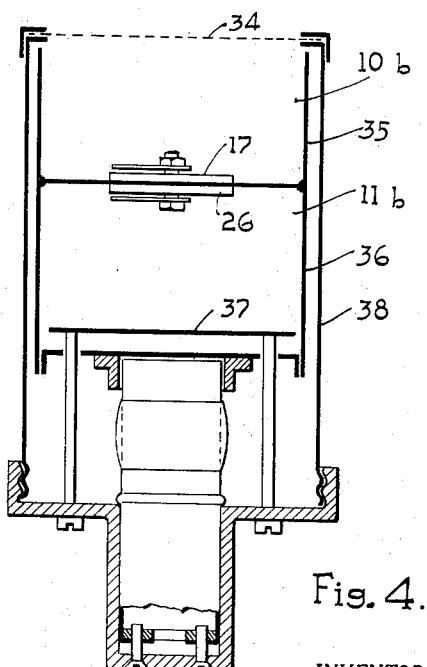

Such a construction is shown in Fig. 4, in which the testing chamber designated as 10b and the comparison chamber as 11b are shown symmetrical. Chamber 10b consists of a grid-like closure 34 which acts as one of the electrodes, while a cup-shaped member 35 with a radium preparation 17 acts as a counter-electrode. The chamber 11b is composed of an inverted cup-shaped shell 36 which with radium preparation 26 acts as an electrode, while plate 37 acts as a counter-electrode. The parts are secured in a manner similar to that shown in Fig. 3, and as in that figure, a capacitor is formed by the metallic shells 35 and 36 and the outer metallic cylinder 38. This capacitor is connected between the control electrode and the cathode. By this construction only a single area of high insulation is required.

Figure 5:
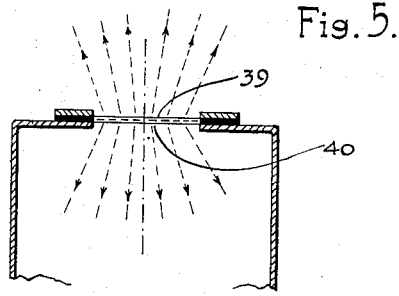
Fig. 5 shows a modified arrangement with reference to the radioactive preparation.

Fig. 5 illustrates a modification with respect to the mounting of the radioactive preparation which offers important advantages; particularly with a construction such as shown in Fig. 4 wherein symmetrical chambers are employed. The substance serving as the source of the ionizing radiation is contained between thin metal foils 39 and 40 which are practically transparent to the radiation. By this means a single radioactive source can supply the radiation for more than one chamber, and in the case of symmetrical chambers there is provided a uniform radiation in both chambers in a simple and reliable manner. This mounting of the radioactive material also is advantageous providing economy in the use of radioactive material in other chamber constructions, and the eventual reduction in intensity of the radiation with time is the same in both chambers.

The symmetrical chamber construction is especially suitable for constructions which are to be operated under extreme climatic and barometric conditions. It may, however, be mentioned that this construction is disadvantageous in that fluctuations in the operating voltage are transferred in the same proportion to the control voltage of the cold cathode tube or other indicating device. A further disadvantage of the symmetrical arrangement resides in the fact that changes in the conductivity of the testing chamber result in approximately only half as large a variation in the control voltage as may be realized with a construction using one chamber working in saturation. For cases in which a wide range of density compensation is unnecessary it may often be advisable to dispense with symmetry of the chambers, and the density compensation may be made as described below.

According to a further development of the invention, density compensation may be obtained either by the use of two chambers or by the use of a single chamber with two parts operating in parallel, both of the chambers exhibiting an inverse dependence of current on density. To make such an arrangement clearer, consideration should be given to the relationship between the gas density and the current in a chamber or parts of a chamber for various spacings of the chamber electrodes.

First considering a chamber with small electrode spacing and in which the ionizing radiation reaches the opposite wall without dissipation of all of its energy in the gas-filled space. In this case the portion of the radiation energy utilized for ionization inside the chamber depends on the number of gas molecules contacted as the radiation passes through the chamber, that is, on the gas density. With increasing gas density an increasing number of ions are formed and the ionization current increases. The high electric field strength resulting from small electrode spacing drives all of the ions at high speed to the electrodes, and the losses by recombination and similar effects are minimized. Even at a relatively small applied voltage the chamber operates in the saturation part of its current-voltage characteristic.

Secondly considering the case of a larger chamber with larger spacing between the electrodes, the number of ions formed in the chamber do not increase with increasing gas density, as the entire radiation energy is dissipated inside the chamber even at low gas density, that is, the radiation is stopped by impacts with gas molecules before reaching the opposite wall of the chamber. In a larger chamber, for a given voltage the electric field strength is lower, the ion speeds are smaller, and their paths to the electrodes are longer. The losses of ions in the gas-filled space are therefore much higher and even increase with increasing gas density. The large chamber shows, therefore, a decrease of current as the gas density is increased, and the chamber does not operate in the saturation part of its current voltage characteristic.

Accordingly, it is observed that the ionization current increases with increasing air density if the chamber dimensions are smaller than the reach length of the alpha radiation, while the ionization current decreases with increasing air density if the chamber dimensions are larger than said reach length. It is, therefore, obvious, that a parallel arrangement of one appropriate "small" chamber and another appropriate "large" chamber can, as a whole, be self compensating with respect to changes in air density within certain limits. The same result may be achieved with a simple construction by dividing a single ionization chamber into two parts, of whch one has a narrow spacing, compared with the reach length of alpha rays, while the other has a wide spacing and operates in the ascending region of its current-voltage characteristic (with current as ordinates and voltage as abscissae).

Such a parallel arrangement of chambers or chamber sections may be connected in series with a resistor or other suitable resistive element and in this way it is possible to construct a detecting device which is self-compensating at least to a certain extent with respect to changes in air density and which, nevertheless, has only one ionization chamber and one resistor or similar element.

Consider again an arrangement with two ionization chambers. It has been explained earlier in the specification, why it is desirable to use a non-saturated test chamber together with a control chamber working in its saturated region. In order to obtain saturation in the control chamber it is necessary to operate with relatively high electrical field strengths. In order to obtain these field strengths by applying a reasonably low voltage, the spacings should not be made too large. Also for constructional reasons smaller chambers are usually preferable. A small comparison chamber will, on the other hand, tend to show a considerable increase of ionization current with increasing air density and its density dependence will not match the density dependence of the open and non-saturated test chamber. The density dependence of a "small" chamber can in such a case often be reduced to a fraction by reducing the range of the ionizing radiation. This is done by covering the source of radiation with a foil partially transparent to the radiation and of suitable thickness so that a portion of the energy of the rays is dissipated as the radiation passes through the foil so as to shorten the radiation range to an extent that the remaining radiation is stopped in the free space between the electrodes. In the constructional example of Fig. 3, the radiation of the radium preparation 26 in the chamber 11a is covered by the aluminum foil 42. In order to increase the field strength there is provided a grid-like anode 25 approximately in the middle of the cap 18 forming the chamber walls.

In the constructions above described, a precise regulation of the radiation intensity of the ionizing radiator is obviously of great significance. This regulation is effected in the simplest manner by means of shutters which in the constructional example of Fig. 3 are in the form of half-round discs 19 and 43.

I claim:

1. Apparatus responsive to changes in the composition of a gas, comprising at least one ionization chamber which is provided with electrodes and is readily accessible to the gas to be tested, means for ionizing the gas, an indicating device sensitive to voltage variations and including a control electrode, a resistance element connected electrically with said chamber and indicating device, and a source of electric power connected across the ionization chamber and resistance element, said resistance element being adapted to convert a change in the ionization current into a voltage change at the control electrode of said indicating member, and means for maintaining the voltage at the control electrode of the indicating member substantially independent of the gas density.

2. Apparatus responsive to changes in the composition of a gas, comprising an ionization chamber which is provided with electrodes and is readily accessible to the gas to be tested, a second ionization chamber provided with electrodes and electrically connected in series therewith and acting as a comparison chamber, said second chamber filled with gas, means in the wall of the second chamber varying the pressure therein in correspondence with variations in the density of the surrounding atmosphere, means for ionizing the gases in said chambers, and an indicating member sensitive to voltage variations and including a control electrode connected between the electrodes of the said chambers.

3. Apparatus responsive to changes in the composition of a gas, comprising an ionization chamber which is provided with electrodes and is readily accessible to the gas to be tested, a second ionization chamber provided with electrodes and electrically connected in series therewith, and acting as a comparison chamber, said second chamber being non-hermetically sealed and being thereby subject to the same changes in gas density as the first chamber, means for ionizing the gases in said chambers, and an indicating member sensitive to voltage variations and including a control electrode connected between electrodes of the said chambers.

4. Apparatus responsive to changes in the composition of a gas, comprising an ionization chamber provided with electrodes and readily accessible to the gas to be tested, a second ionization chamber provided with electrodes and electrically connected in series with the first chamber and acting as a comparison chamber, means for ionizing the gas in the chambers, and an indicating member sensitive to voltage variations and including a control electrode connected between electrodes of the said chambers, means leading into the second chamber and open to the surrounding atmosphere and providing a high resistance diffusion path for the gas to the second chamber, the walls of said path being metallic and forming a condenser for storing control energy, said condenser being connected with the control electrode of the indicating member for operating the same upon the development of a suitable potential on the control electrode.

5. Apparatus responsive to changes in the composition of a gas, comprising an ionization chamber provided with electrodes and readily accessible to the gas to be tested, a second ionization chamber provided with electrodes and electrically connected in series with the first chamber, and acting as a comparison chamber, said second chamber being in communication with the surrounding atmosphere, means for ionizing the gas in said chambers, and an indicating member sensitive to voltage changes and connected to electrodes of the said chambers, said chambers being constructed substantially symmetrically in geometrical respect, said ionizing means being adapted to emit ionizing rays of substantially equal strength in the two chambers.

6. Apparatus responsive to changes in the composition of a gas, comprising an ionizing chamber provided with electrodes and readily accessible to the gas to be tested, a second ionizing chamber provided with electrodes and electrically connected in series to the first chamber and acting as a comparison chamber, said second chamber being non-hermetically sealed with respect to the gas to be tested, there being a high resistance path for such gases to the second chamber to retard diffusion of the gas thereinto, an indicating member sensitive to voltage changes and connected to electrodes of said chambers, and a common radioactive preparation serving as ionizing radiator for both chambers and covered by at least one foil transparent to the radiation.

7. Apparatus according to claim 2, wherein at least one of the ionizing chambers is divided into two parts of which one operates approximately in the range of saturation and the other in the ascending portion of its current-voltage characteristic.

8. Apparatus according to claim 2, wherein one of the ionization chambers operates in the saturation range and including another connected thereto in parallel and operating in the ascending portion of its current-voltage characteristic.

9. Apparatus according to claim 2, wherein in at least one of the chambers there is provided a foil transparent to the radiation and acting to reduce the range of the ionizing radiation, said foil covering the source of radiation.

10. Apparatus according to claim 2, including a shutter adjustably mounted in at least one of the chambers for controlling the intensity of the ionizing radiation.

11. Apparatus responsive to changes in the composition of a gas, comprising two ionization chambers provided with electrodes and electrically connected in series, means for ionizing the gas in said chambers, a glow relay having a control electrode electrically connected to the series-connected electrodes of the ionizing chamber, a condenser in the control circuit of the glow relay, a source of current connected to said chambers, said parts being so connected that a change in the inner resistance of one of the ionization chambers effects a voltage change at the control electrode of the glow relay and thereby causes ignition of the latter with the aid of the condenser, the first ionization chamber being partially open to the atmosphere while the second chamber acts as a comparison chamber and communicates with the atmosphere by way of a high resistance and narrow diffusion path, the walls defining said path forming a condenser whose capacity constitutes at least part of the aforementioned circuit condenser, the electrodes having the same potential and the control electrode being so secured to the glow relay that only a single insulation area is necessary for said potential; a shutter for adjusting the intensity of the ionizing radiation in at least one of the chambers, the first chamber being adapted to operate in the ascending portion of the current-voltage characteristic while the second chamber operates approximately in the saturation range, the common potential of the two chambers at normal atmospheric variations of temperature and pressure remaining approximately constant, the first chamber being divided into a saturated and an unsaturated portion while the second chamber is provided with foil for covering the radioactive preparation to effect shortening of the range of the alpha-rays in such second chamber.

12. Apparatus responsive to change in the composition of a gas, comprising two ionization chambers provided with electrodes and electrically connected in series, means for ionizing the gas in said chambers, a glow relay having a control relay and including a control electrode joined to the connected electrodes of the chambers, a condenser in the control circuit of the glow relay, said parts being so connected with each other that upon being connected with a source of current a change in the inner resistance of one of the ionization chambers effects a voltage change at the control electrode of the glow relay and thereby causes ignition of the glow relay with the aid of the condenser, the first ionization chamber being partially open to the outer atmosphere while the second chamber constitutes a comparison chamber and has a narrow, high resistance diffusion path leading from the such second chamber to the outer atmosphere, the walls of said path forming a condenser whose capacity constitutes at least part of the capacity of the aforementioned circuit condenser, the electrodes of equal potential and the control electrode of the glow relay being so secured to the latter that only a single insulation area is required for such potential, the two chambers being constructed substantially symmetrically in geometric respect so that change in pressure and temperature and also changes in the intensity of the radioactive radiator are without substantial effect upon the common potential of the two chambers.

13. Apparatus responsive to changes in the composition of a gas, comprising two ionization chambers provided with electrodes and electrically connected in series, means for ionizing the gas in said chambers, a glow relay having a control electrode electrically connected to the series-connected electrodes of the ionization chambers, a condenser in the control circuit of the glow relay, said parts being so connected with each other that upon being connected with a source of current a change in the inner resistance of one of the ionization chambers effects a voltage change at the control electrode of the glow relay and thereby causes ignition of the latter with the aid of the condenser, the first ionization chamber being partially open to the outer atmosphere while the second ionization chamber constitutes a comparison chamber and has a narrow, high resistance diffusion path leading from such second chamber to the outer atmosphere, the walls of said path forming a condenser whose capacity constitutes at least a part of the capacity of the aforementioned circuit condenser, the electrodes having the same potential and the control electrode being so secured to the glow relay that only a single insulation area for such potential is necessary, there being a common radium preparation for the two chambers for ionizing the gas therein, and at least one foil transparent to the alpha-rays for effecting spatial separation of the two chambers.

14. Apparatus responsive to changes in the composition of a gas and particularly for detecting the presence of combustion gases or smoke, comprising an ionizing chamber having access for the gas to be tested, a second ionizing chamber non-hermetically sealed with respect to the surrounding atmosphere and constituting a comparison chamber, two spaced electrodes in each of said chambers, an electrode of each chamber being connected together so that said chambers are electrically in series, a source of electric potential connected to the two other electrodes of said chambers, a gas discharge tube having two spaced electrodes connected with a source of potential and a third electrode joined to the connected electrodes of the two ionizing chambers, said third electrode being arranged to effect the discharge in said tube upon change in the electrical properties of the gas in the first mentioned ionizing chamber, and a condenser connected to said third electrode and to the source of potential.

References Cited in the file of this patent

UNITED STATES PATENTS

| | | |
|---|---|---|
| 2,145,866 | Failla | Feb. 7, 1939 |
| 2,408,051 | Donelian | Sept. 24, 1946 |
| 2,465,377 | Jaeger | Mar. 29, 1949 |

FOREIGN PATENTS

| | | |
|---|---|---|
| 398,722 | Great Britain | Sept. 21, 1933 |